(12) United States Patent
Okawa

(10) Patent No.: US 8,488,209 B2
(45) Date of Patent: Jul. 16, 2013

(54) IMAGE READER, AND CONTROL METHOD AND CONTROL PROGRAM FOR THE SAME

(75) Inventor: Satoshi Okawa, Toride (JP)

(73) Assignee: Canon Kabushiki Kaisha (JP)

( * ) Notice: Subject to any disclaimer, the term of this patent is extended or adjusted under 35 U.S.C. 154(b) by 1484 days.

(21) Appl. No.: 11/476,985

(22) Filed: Jun. 28, 2006

(65) Prior Publication Data

US 2007/0002393 A1    Jan. 4, 2007

(30) Foreign Application Priority Data

Jun. 29, 2005 (JP) .................................. 2005-189796

(51) Int. Cl.
*H04N 1/40* (2006.01)

(52) U.S. Cl.
USPC ........... 358/462; 358/474; 358/496; 358/497; 358/498; 399/365

(58) Field of Classification Search
USPC .............. 358/1.15, 1.14, 1.18, 474, 462, 463, 358/468, 496, 497, 498; 399/365, 367, 371; 271/3.14, 8.1
See application file for complete search history.

(56) References Cited

U.S. PATENT DOCUMENTS

| | | | |
|---|---|---|---|
| 5,841,451 A * | 11/1998 | Hirabayashi et al. | 347/41 |
| 2002/0071135 A1 * | 6/2002 | Takeda et al. | 358/1.14 |
| 2002/0176634 A1 * | 11/2002 | Ohashi | 382/275 |
| 2004/0125412 A1 * | 7/2004 | Sugeta | 358/3.26 |

FOREIGN PATENT DOCUMENTS

| | | |
|---|---|---|
| JP | 2003-333290 A | 11/2003 |
| JP | 2003-348336 A | 12/2003 |

* cited by examiner

*Primary Examiner* — Kimberly A Williams
(74) *Attorney, Agent, or Firm* — Rossi, Kimms & McDowell LLP

(57) ABSTRACT

There is provided an image reader capable of reading a good image free from the influence of foreign matter such as dust. This image reader includes an ADF, a reader section, a dust correcting section, and a CPU. The CPU controls the ADF and the reader section according to the detection result of the dust correcting section so as to selectively execute one of a first moving original reading mode and a second moving original reading mode. In the first moving original reading mode, the reader section is fixed at a predetermined position to read the images while the originals are fed at a first sheet-to-sheet interval. In the second moving original reading mode, the reader section is fixed at a predetermined position to read the images while the originals are fed at a second sheet-to-sheet interval longer than the first sheet-to-sheet interval.

8 Claims, 16 Drawing Sheets

IMAGE READER, AND CONTROL METHOD AND CONTROL PROGRAM FOR THE SAME

BACKGROUND OF THE INVENTION

1. Field of the Invention

This invention relates to an image reader, and a control method and a control program for the same.

2. Description of the Related Art

Conventionally, there have been proposed image readers equipped with an automatic document feeder (hereinafter, ADF) which include a moving original reading mode and a stationary original reading mode as a reading mode using the ADF.

The moving original mode is a mode in which an original reading section on an image reader side is fixed at a predetermined reading position to read originals while the originals are fed by the ADF at a constant speed. The stationary original mode is a mode in which an original is fed onto a platen glass by the ADF and fixed on the platen glass and the original reading section reads the original while moving.

As such an image reader having the moving original mode and the stationary original mode, there has been known an image reader that changes the moving original mode to the stationary original mode in a case where dust is detected during the execution of a job of the moving original mode, in order to maintain the quality of read images (see Japanese Laid-open Patent Publication (Kokai) No. 2003-333290).

Also, there has been known an image processing apparatus that performs dust correction processing so that dust which is detected in the moving original mode becomes less conspicuous on an image to be printed (see Japanese Laid-open Patent Publication (Kokai) No. 2003-348336).

However, in the above-described image reader that changes the moving original mode to the stationary original mode when dust is detected during the execution of the job of the moving original mode, there sometimes occurs such a case where the moving original of a subsequent original has already been started at an instant when the reading mode of the subsequent original is tried to be changed to the stationary original mode. This necessitated processing such as interrupting the job of the moving original mode and discarding the already read image in order to re-read the same original.

Further, if the correction is performed so that the dust which is detected in an interval of the fed originals (sheet-to-sheet interval) during the execution of the job of the moving original mode becomes less conspicuous, there is a limit to the correctable number of dusts.

In a case where the job of the moving original mode is executed for a long time, the number of dusts detected at the reading position increases, and if the sheet-to-sheet interval is short, part of the detected dusts might not be corrected. This may possibly result in the occurrence of streaks or the like in a read image.

SUMMARY OF THE INVENTION

The present invention was made to solve the above-described problems and it is an object of the present invention to provide an image reader capable of reading a good image free from the influence of foreign matter such as dust, and a control method and a control program for the same.

To attain the object stated above, according to a first aspect of the present invention, there is provided an image reader comprising an original feeding section that sequentially feeds a plurality or originals sheet by sheet, a reading section that reads images on the originals to output image data, a foreign matter detecting section that detects foreign matter existing at a reading position of the reading section, and a control section that controls the original feeding section and the reading section according to a detection result of the foreign matter detecting section so as to selectively execute one of a first moving original reading mode and a second moving original reading mode, the first moving image reading mode being a mode in which the reading section is fixed at a predetermined reading position to read the images on the originals while the originals are fed at a first interval by the original feeding section, and the second moving original reading mode being a mode in which the reading section is fixed at a predetermined reading position to read the images on the originals while the originals are fed at a second interval longer than the first interval by the original feeding section.

With such a structure, it is possible to appropriately set the sheet-to-sheet interval when the moving original is read, according to the detection result of foreign matter existing at the reading position. As a result, the detection of foreign matter at the reading position, the image data correction processing, and so on can be performed accurately before a subsequent original is fed thereto, which makes it possible to read a good image free from the influence of foreign matter such as dust.

Preferably, an image reader further comprises a storage section that stores information regarding the foreign matter detected by the foreign matter detecting section, and wherein the control section controls the original feeding section and the reading section so as to selectively execute one of the first moving original reading mode and the second moving original reading mode according to the information stored in the storage section.

Preferably, an image reader further comprises a correcting section that reduces the influence of the foreign matter detected by the foreign matter detecting section on the image data.

More preferably, information regarding the foreign matter includes a number of times the correcting section fails to normally finish correction processing.

Further preferably, in a case where the number of times the correcting section fails to normally finish the correction processing exceeds a predetermined value, the control section controls the original feeding section and the reading section so as to execute the second moving original reading mode.

Preferably, information regarding the foreign matter includes a number of pieces of foreign matter detected by the foreign matter detecting section.

More preferably, in a case where the number of pieces of foreign matter detected by the foreign matter detecting section consecutively exceeds a predetermined value, the control section controls the original feeding section and the reading section so as to execute the second moving original reading mode.

Preferably, the control section controls the original feeding section and the reading section according to the detection result of the foreign matter detecting section so as to selectively execute a stationary original reading mode, the stationary original reading mode being a mode in which the originals are fed by the original feeding section to be fixed at a predetermined position and the reading section reads the images on the originals while moving.

More preferably, an image reader further comprises a setting section that sets a high-image quality mode in which the reading section reads the images on the originals with high image quality, and wherein in a case where the setting section sets the high-image quality mode, the control section controls the original feeding section and the reading section so as to execute the second moving original reading mode or the stationary original reading mode.

To attain the object stated above, according to a second aspect of the present invention, there is provided a control method for an image reader comprising an original feeding section that sequentially feeds a plurality of originals sheet by sheet and a reading section that reads images on the originals to output image data, the method comprising a foreign matter detecting step of detecting foreign matter existing at a reading position of the reading section, and a control step of controlling the original feeding section and the reading section according to a detection result of the foreign matter detecting step so as to execute one of a first moving original reading mode and a second moving original reading mode, the first moving original reading mode being a mode in which the reader section is fixed at a predetermined reading position to read the images on the originals while the originals are fed at a first interval by the original feeding section, and the second moving original reading mode being a mode in which the reading section is fixed at a predetermined reading position to read the images on the originals while the originals are fed at a second interval longer than the first interval by the original feeding section.

To attain the object stated above, according to a third aspect of the present invention, there is provided a control program executed in an image reader comprising an original feeding section that sequentially feeds a plurality of originals sheet by sheet and a reading section that reads images on the originals to output image data, the program comprising a foreign matter detecting module for detecting foreign matter existing at a reading position of the reading section, and a control module for controlling the original feeding section and the reading section according to a detection result of the foreign matter detecting module so as to execute one of a first moving original reading mode and a second moving original reading mode, the first moving original reading mode being a mode in which the reader section is fixed at a predetermined reading position to read the images on the originals while the originals are fed at a first interval by the original feeding section, and the second moving original reading mode being a mode in which the reading section is fixed at a predetermined reading position to read the images on the originals while the originals are fed at a second interval longer than the first interval by the original feeding section.

The above and other objects, features, and advantages of the invention will become more apparent from the following detailed description taken in conjunction with the accompanying drawings.

DETAILED DESCRIPTION OF THE PREFERRED EMBODIMENTS

Figure 1:
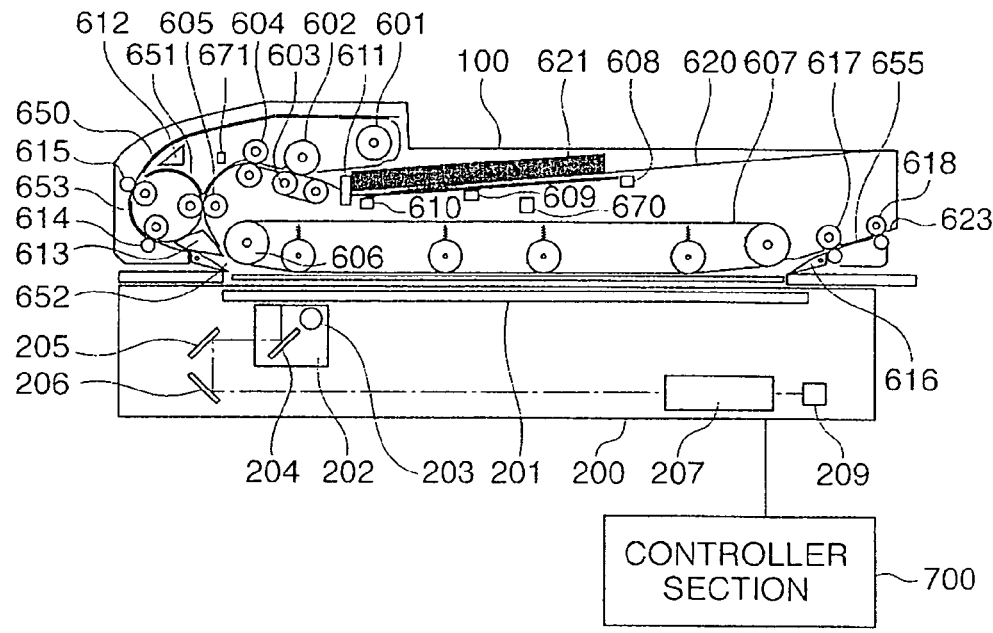
FIG. 1 is a cross-sectional view showing the configuration of an image reader according to an embodiment of the present invention.

The present invention will now be described in detail with reference to the drawings showing a preferred embodiment thereof. In the drawings, elements and parts which are identical throughout the views are designated by identical reference numeral, and duplicate description thereof is omitted.

FIG. 1 is a cross-sectional view showing the configuration of an image reader according to an embodiment of the present invention.

In FIG. 1, the image reader includes an automatic document feeder 100, a reader section 200, and a controller section 700.

As shown in FIG. 1, the automatic document feeder 100 has an original tray 620 for placing an original bundle 621 thereon, a stopper 611 protruding from the original tray 620 to restrict the original bundle 621 from advancing toward a downstream side before the feeding of originals is started, and a feed roller 601. It should be noted that the original bundle 621 consists of at least one sheet of paper or more. The feed roller 601 drops onto an original surface of the original bundle 621 placed on the original tray 620 to rotate. Consequently, an uppermost original P of the original bundle 621 is fed. The originals fed by the feed roller 601 are separated sheet by sheet by actions of a separation roller 602 and a separation belt 603. This separation is realized by a well-known retard separation technique.

The original separated by the separation roller 602 and the separation belt 603 is conveyed to a resist roller 605 by a conveyor roller 604 to abut on the resist roller 605. Consequently, the original is formed in a loop shape so that slanted movement of the original in the course of the conveyance is corrected.

On the downstream side of the resist roller 605, there is provided a reverse/feed flapper 613 that guides the original having passed through the resist roller 605 to a feed path 652 through which the original is conveyed toward the platen glass 201 or to a reverse path 653. The reverse path 653 has a first reverse roller 614 and a second reverse roller 615, both of which rotate for reversing the original. On the downstream side of the second reverse roller 615, there is provided a reverse flapper 612, which guides the original conveyed from the direction of the second reverse roller 615 to a reverse path 650 or to a re-feed path 651.

The original conveyed to the feed path 652 is sent onto the platen glass 201 by a feed belt 607. Here, the feed belt 607 is driven by a belt driving roller 606 and touches the platen glass 201. The original fed by the feed belt 607 is guided to an original discharge path 655 via a feed/discharge roller 617, a discharge flapper 616, and a discharge roller 618 to be sent to an original discharge port 623.

Further, on a bottom of the original tray 602, provided are three sensors, namely, an original rear-end detecting sensor 608, a final original detecting sensor 609, and an original set detecting sensor 610. The original set detecting sensor 610 is a transmissive optical sensor detecting that the original bundle 621 has been set on the original tray 620. The original rear-end detecting sensor 608 is a reflective optical sensor for judging whether or not an original is a half-size original. The final original detecting sensor 609 provided between the original set detecting sensor 610 and the original rear-end detecting sensor 608 is a reflective optical sensor for judging whether or not a currently conveyed original is a final original. The final original detecting sensor 609 also detects whether or not there still remains an original for reading subsequent to a currently read original.

The original tray 620 further has a guide plate (not shown) slidable in a sub-scan direction of the original bundle 621 placed thereon and an original width detecting sensor 670 interlocking with the guide plate to detect the width of an original. The combination of the original width detecting sensor 670 and the original rear-end detecting sensor 608 enables the discrimination of the size of originals in the original bundle 621 placed on the original tray 620. It is also possible to detect the length of an original by an original length detecting sensor 671 provided in a conveyance path, based on the conveyance distance from a leading end to a rear end of the currently conveyed original. The size of an original is also discriminatable by the combination of the length of the original detected by the original length detecting sensor 671 and the width of the original detected by the original width detecting sensor 670.

Figure 4:
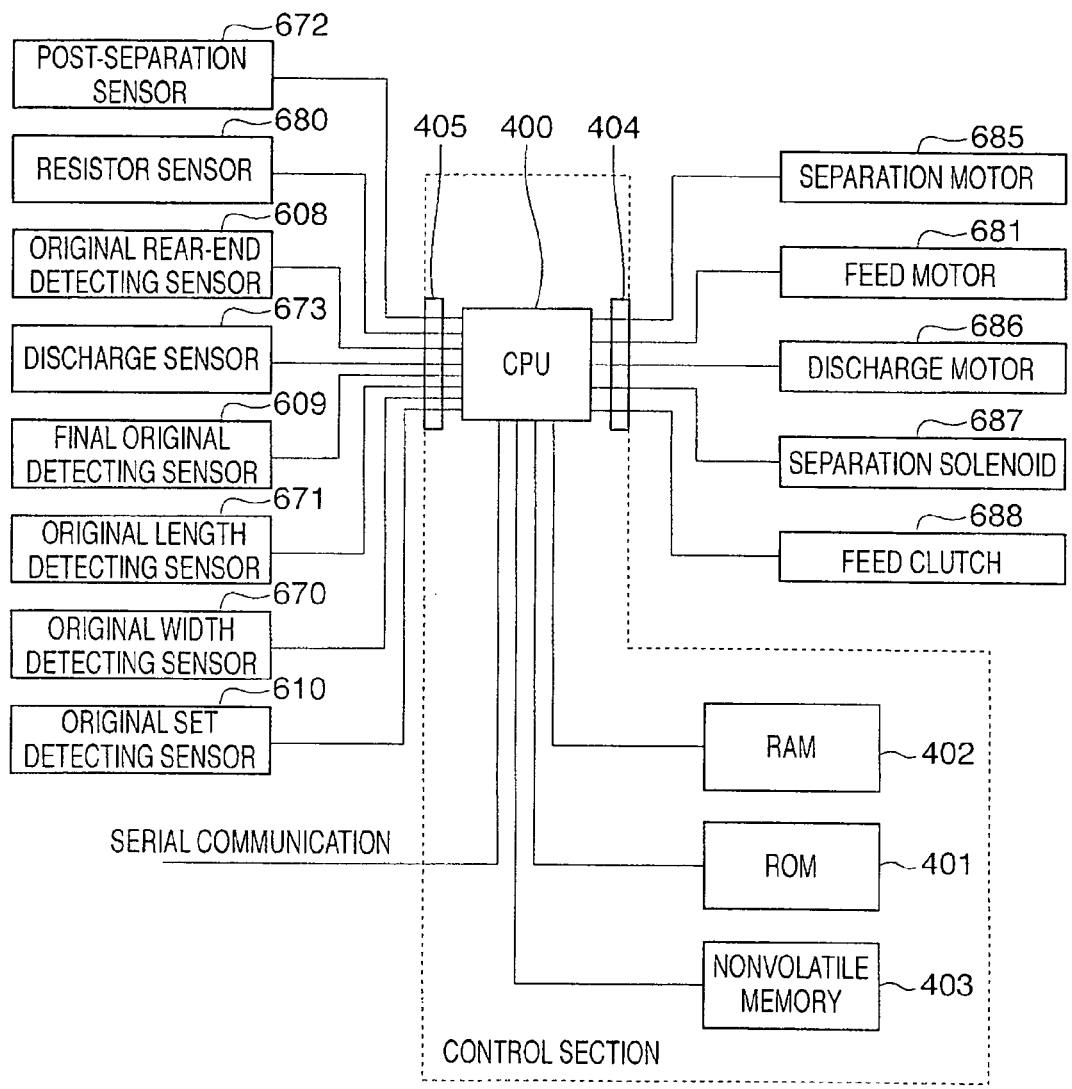
FIG. 4 is a block diagram of a control section of the automatic document feeder.

The automatic document feeder 100 includes a control section which is shown in FIG. 4 to be described later.

The reader section 200 optically reads image information recorded on an original, photoelectrically converts it, and inputs the resultant thereto as image data. The reader section 200 has the platen glass 201, a scanner unit 202 having a lamp 203 and a mirror 204, mirrors 205, 206, a lens 207, a CCD sensor 208, and so on.

Next, a description will be given of the operation of a moving original mode in which the scanner unit 202 is fixed at a predetermined position to read an image while an original is being moved, for reading the original whose one side has an image printed.

FIGS. 2A to 2D are cross-sectional views of the automatic document feeder schematically showing how originals are fed in the moving original mode.

Figure 2A:
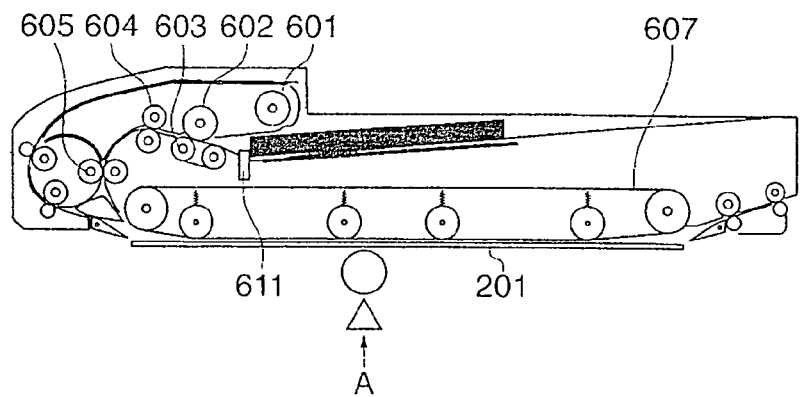
FIGS. 2A, 2B, 2C, and 2D are cross-sectional views of an automatic document feeder schematically showing how originals are fed in a moving original mode.
Figure 2B:
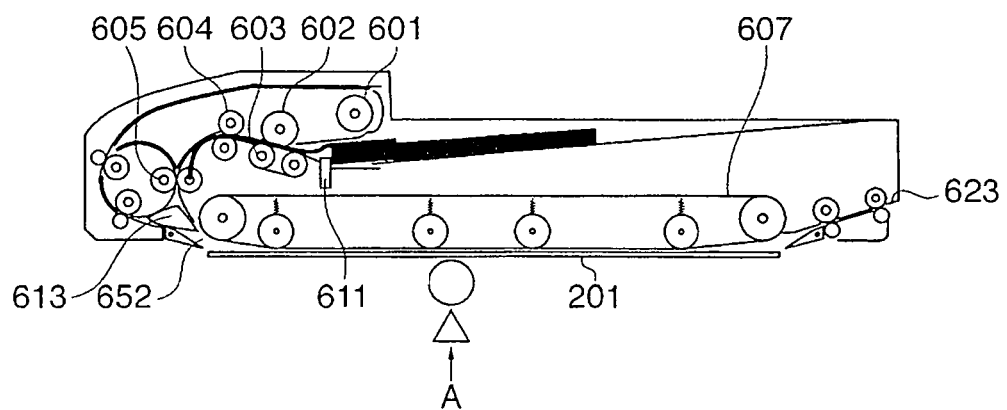
Figure 2C:
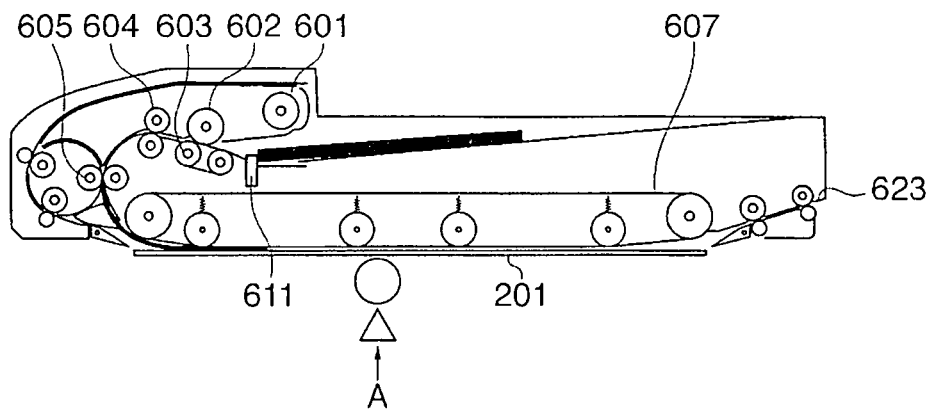
Figure 2D:
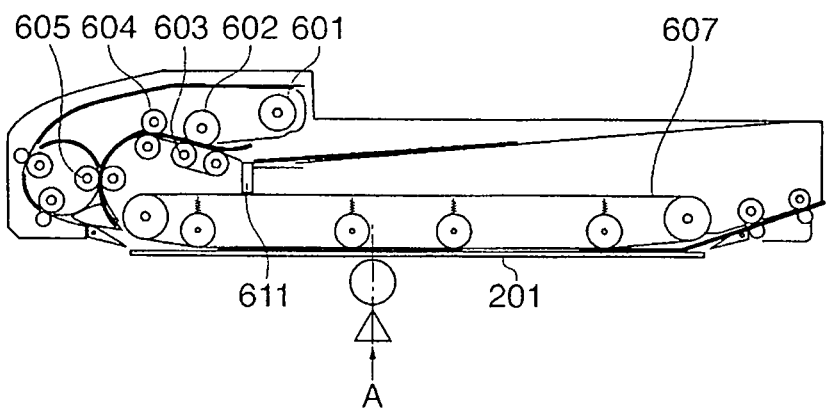

When the automatic document feeder 100 is instructed to start feeding originals, the stopper 611 moves down and the feed roller 601 drops onto the top surface of the original (see FIG. 2A). The actions of the feed roller 601, the separation roller 602, the separation belt 603, and the conveyor roller 604 separate only the uppermost original from the original bundle 621, and the separated original is sent to the resist roller 605. Here, the reverse/feed flapper 613 is set so as to send the original to the feed path 652 (see FIG. 2B).

The rotation of the resist roller 605 guides the original onto the platen glass 201 via the feed path 652. The original is conveyed above A point in the drawings at a predetermined speed, and an image on the original is read by the scanner unit 202 kept on standby under the A point. At this time, a read start signal is notified to the reader section 200 at the timing when a leading end of the original passes through the A point. The read original is conveyed as it is in the right direction in the drawing and discharged from the original discharge port 623 to the outside of the automatic document feeder 100 (see FIG. 2C).

When a rear end of an N-th original, which is being read above the A point, passes through the conveyor roller 604, the feeding of an (N+1)-th original is started from the original bundle 621 placed on the original tray 620. Likewise, this original is conveyed to the platen glass 201, followed by a read operation of an image on this original (see FIG. 2D). At this time, by adjusting an activation timing of the resist roller 605 with the original abutting on the resist roller 605, an interval between this original and the preceding original which is being read above the A point is appropriately adjusted. Then, the originals, which are kept spaced from each other by a predetermined interval, are conveyed on the platen glass 201.

Figure 3:
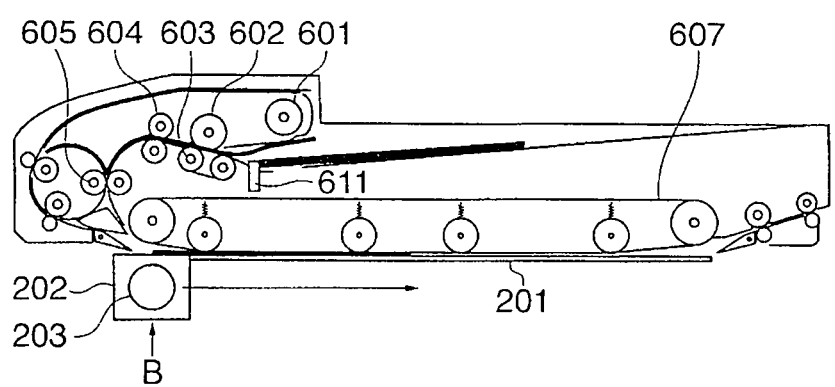
FIG. 3 is a cross-sectional view of the automatic document feeder schematically showing how originals are fed in a stationary original mode.

FIG. 3 is a cross-sectional view of the automatic document feeder schematically showing how originals are fed in a stationary original mode.

To read in the stationary original mode an original whose one side has an image printed, a rear end of the original is fixed at a position B on the platen glass 201 and the scanner unit 202 is moved in an arrow direction. Note that the position B is an end part on the reverse/feed flapper 613 side.

FIG. 4 is a block diagram of the control section of the automatic document feeder 100.

The control section of the automatic document feeder 100 includes a CPU 400, a read-only memory (ROM) 401, a random access memory (RAM) 402, a nonvolatile memory 403, an output port 404, and an input port 405.

A control program is stored in the ROM 401, and input data and work data are stored in the RAM 402. A separation motor 685 driving the separation belt 603 and a feed motor 681 driving the resist roller 605 are connected to the output port 404. Further, a discharge motor 686 driving the feed/discharge roller 617 and the discharge roller 618, a separation solenoid 687, and a feed clutch 688 are also connected to the output port 404.

A post-separation sensor 672 detecting the separation of an original, a resistor sensor 680, the original rear-end detecting sensor 608, and a discharge sensor 673 detecting the discharge of an original are connected to the input port 405. Further, the final original detecting sensor 609, the original length detecting sensor 671, the original width detecting sensor 670, and the original set detecting sensor 610 are connected to the input port 405.

The CPU 400 controls the conveyance of originals according to the control program stored in the ROM 401. By serial communication with a central processing unit (CPU) of the reader section 200, the CPU 400 exchanges control data with the reader section 200. Further, an image start signal serving as a reference for a leading end of original image data is also notified to the reader section 200 through a communication line.

Figure 5:
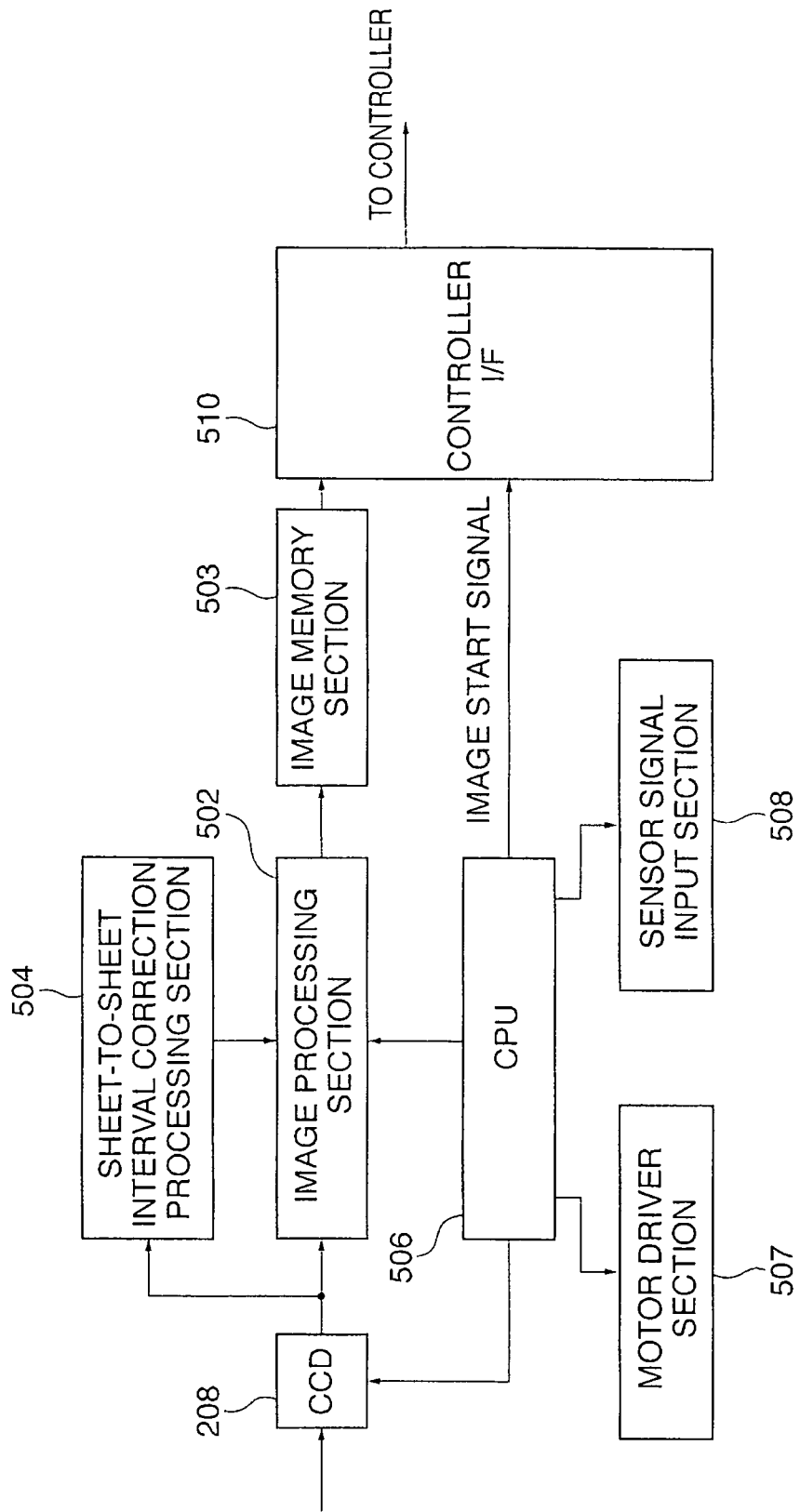
FIG. 5 is a block diagram showing the configuration of a reader section.

FIG. 5 is a block diagram showing the configuration of the reader section 200.

In FIG. 5, reference numeral 506 denotes the CPU that controls the entire reader section 200. The CPU 506 includes a program storage ROM, a work RAM, and the like, not shown.

Reference numeral 507 denotes a motor driver section which is a driver circuit for driving an optical driving motor. Reference numeral 508 denotes a sensor signal input section for taking signals from various kinds of sensors of the reader section 200 into the CPU 506.

The CPU 506 controls the reader section 200 by using the motor driver section 507 and the sensor signal input section 508. Reference numeral 504 denotes a sheet-to-sheet interval correction processing section making sheet-to-sheet interval correction.

An image signal imaged on the CCD 208 by the lens 207 is converted to digital image data, which is then subjected to various kinds of image processing by an image processing section 502 to be written to an image memory section 503.

The data written to the image memory section 503 are sequentially transmitted to the controller section 700 via a controller I/F 510. Further, an image start signal serving as a reference for a leading end of the digital image data of the original and the image start signal notified from the ADF are notified to the controller section 700 via the controller I/F 510 at timings determined by the CPU 506.

Figure 6:
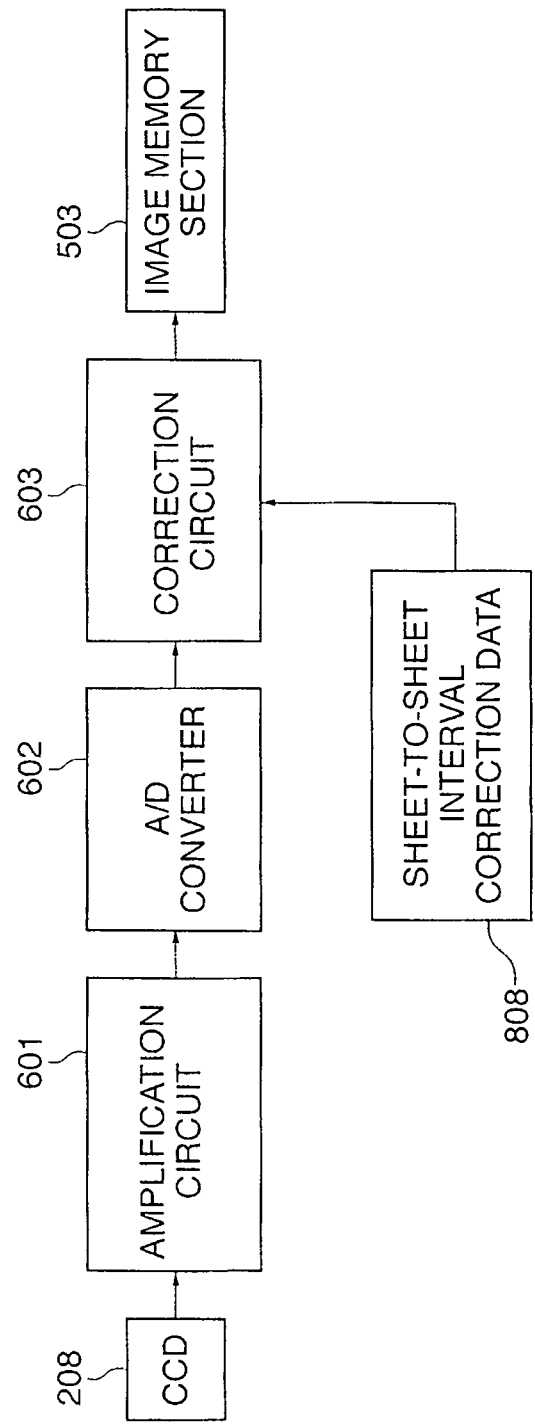
FIG. 6 is a block diagram showing the entire configuration of an image processing section in FIG. 5.

FIG. 6 is a block diagram showing the entire configuration of the image processing section 502 in FIG. 5.

The image processing section 502 includes an amplification circuit 601, an A/D converter 602, and a correction circuit 603.

The CCD 208 outputs an analog image signal for every one read line in the course of scanning an original image. The outputted analog image signal is amplified by the amplification circuit 601 and thereafter converted to an 8-bit digital signal by the A/D converter 602. Then, the correction circuit 603 performs correction processing to the digital signal outputted from the A/D converter 602, based on later-described sheet-to-sheet interval correction data 808 created by the sheet-to-sheet interval correction processing section 504. Thereafter, the digital signal having undergone the correction processing is written to the image memory section 503. The foregoing processing is applied to all pages of the originals, whereby read image data of all the originals are formed.

Figure 7:
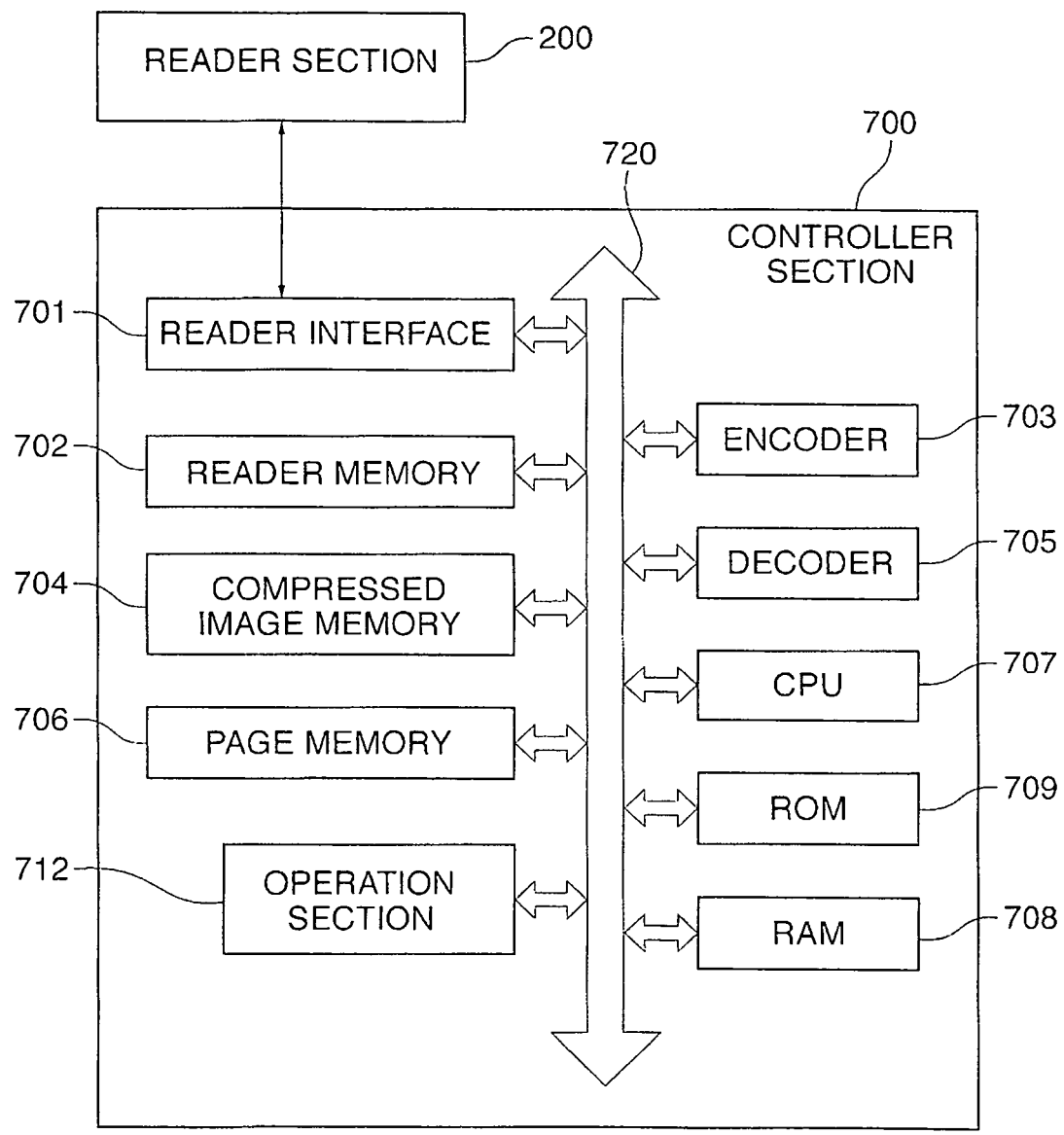
FIG. 7 is a block diagram showing the configuration of a controller section.

FIG. 7 is a block diagram showing the configuration of the controller section 700.

The controller section 700 is connected to the reader section 200 via a reader interface 701. The controller section 700 has, in addition to the reader interface 701, a reader memory 702, an encoder 703, and a compressed image memory 704. It further has a decoder 705, a page memory 706, a CPU 707, a RAM 708, and a ROM 709. These constituent elements are connected to a system bus 720.

In response to the image start signal from the reader section 200 serving as a trigger, the image data stored in the image memory section 503 of the reader section 200 is transmitted to the controller section 700 line by line via the controller I/F 510 and the reader interface 701.

The not-yet compressed image data transmitted to the controller section 700 are sequentially stored in the reader memory 702. The encoder 703 compresses the image data stored in the reader memory 702. The compressed image memory 704 stores the image data resulting from the compression by the encoder 703. The decoder 705 analyzes (expands) the compressed image data stored in the compressed image memory 704 to develop the resultant on the page memory 706. A control program for the controller section 700 is stored in the ROM 709.

The CPU 707 controls each part of the controller section 700 according to the control program stored in the ROM 709. The RAM 708 is a working area for processing executed by the CPU 707. An operation section 712 outputs instructions regarding a reading mode (single-side or double-side, first moving original reading, second moving original reading, stationary original reading, and the like) to the reader section 200. The controller section 700 communicates with the reader section 200 via the reader interface 701 to execute an image read operation according to the mode instructed from the operation section 712.

Figure 8:
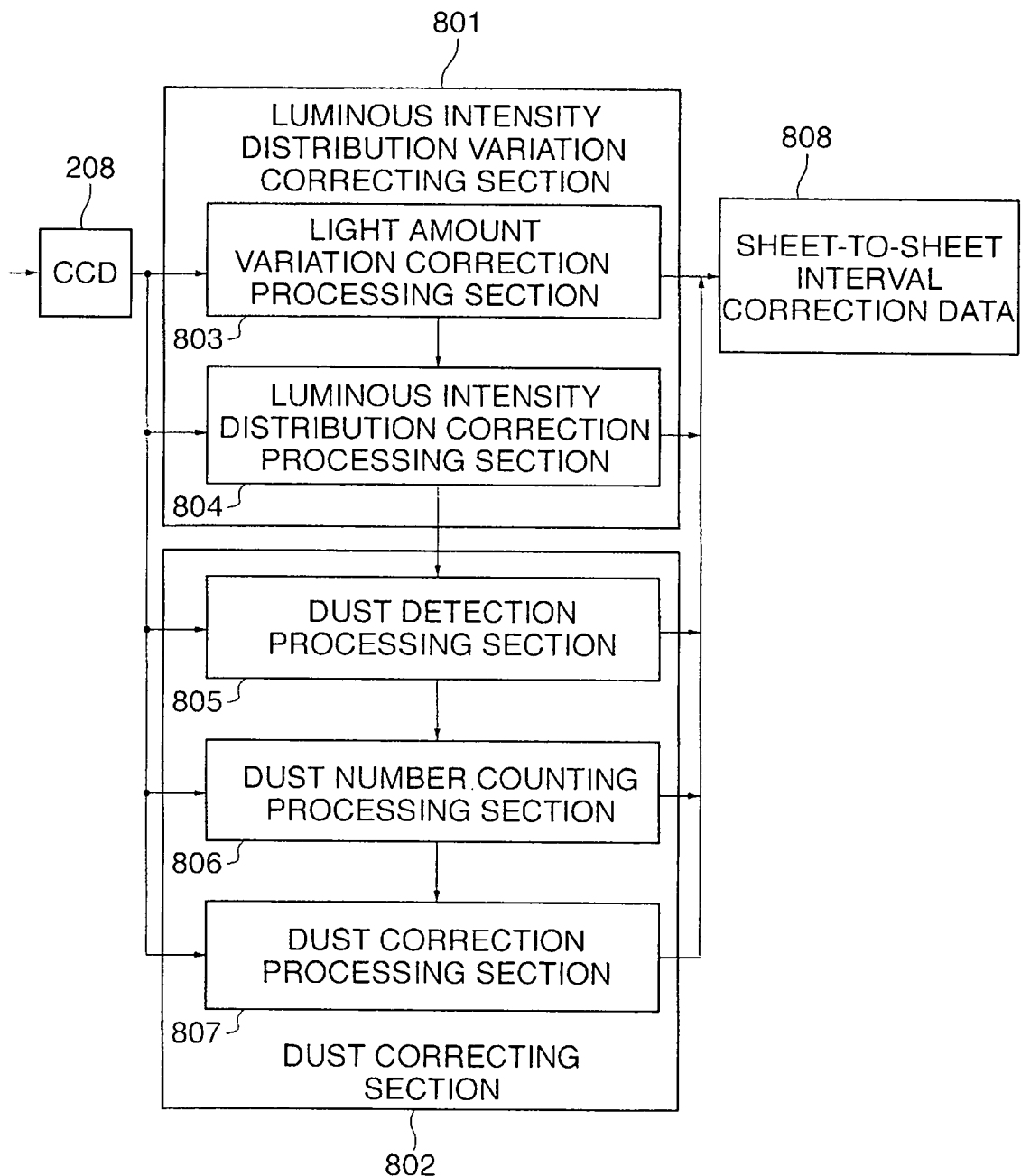
FIG. 8 is a functional block diagram of sheet-to-sheet interval correction processing executed by a sheet-to-sheet interval correction processing section in FIG. 5.

FIG. 8 is a functional block diagram of the sheet-to-sheet interval correction processing executed in the sheet-to-sheet interval correction processing section 504 in FIG. 5.

In this embodiment, luminous intensity distribution variation correction processing and dust correction processing are executed as the sheet-to-sheet interval correction processing.

At the reading position A in FIG. 2, the CCD 208 reads the feed belt 607 in white color facing the CCD 208 in a plurality of intervals of originals, and the sheet-to-sheet interval correction processing section 504 executes the sheet-to-sheet interval correction processing based on white data thereof. The luminous intensity distribution variation correction and dust correction executed in the plurality of intervals of originals will be described.

Figure 9:
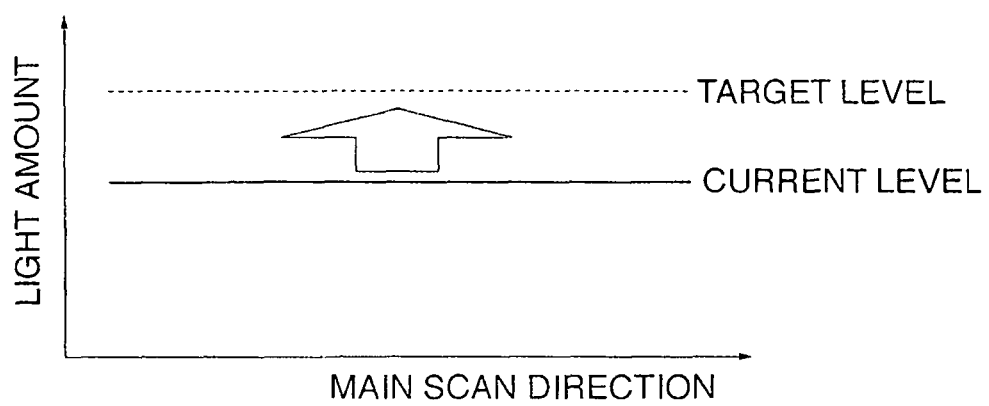
FIG. 9 is a chart useful in explaining light amount variation correction processing.

The luminous intensity distribution variation correcting section 801 includes a light amount variation correction processing section 803 and a luminous intensity distribution correction processing section 804. The correction of the light amount of the lamp 203 is executed by the light amount variation correction processing section 803. The correction processing of the luminous intensity distribution pattern in a main scan direction is executed by the luminous intensity distribution correction processing section 804. The light amount of the lamp 203 gradually decreases when it is kept lighted for a long time. Therefore, the correction processing to raise the light amount level from the current level to a target level as a whole as in FIG. 9 is executed by the light amount variation correction processing section 803.

Figure 10:
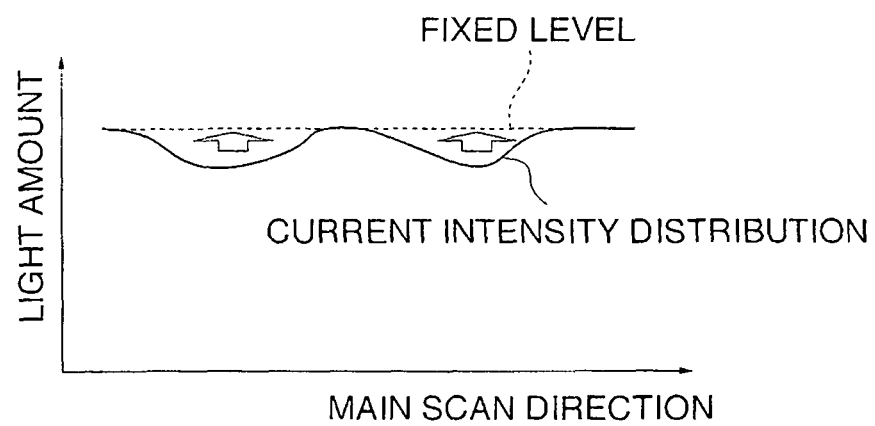
FIG. 10 is a chart useful in explaining luminous intensity distribution correction processing.

Since the luminous intensity distribution in the main scan direction also changes with time, the correction processing to adjust the luminous intensity distribution in the main scan direction to a uniform light amount level (fixed level) as in FIG. 10 is executed by the luminous intensity distribution correction processing section 804.

A dust correcting section 802 detects dust existing on the platen glass 201 from an image of the feed belt 607 which is read at the reading position A (FIG. 2) or B (FIG. 3) via the platen glass 201. This is further followed by the correction processing to reduce the influence of the detected dust on the original read image data. This correction processing includes dust detection processing, dust number counting processing, and dust correction processing.

The dust detection processing is to detect dust existing on the platen glass 201 from the image of the feed belt 607 read at the reading position A or B via the platen glass 201 and is executed by a dust detection processing section 805.

Figure 11:
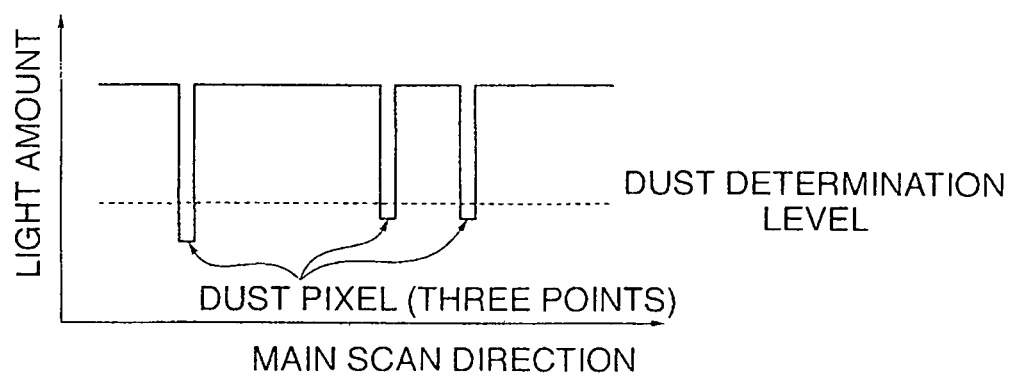
FIG. 11 is a chart useful in explaining dust detection processing and dust number counting processing.
Figures 12A, 12B:
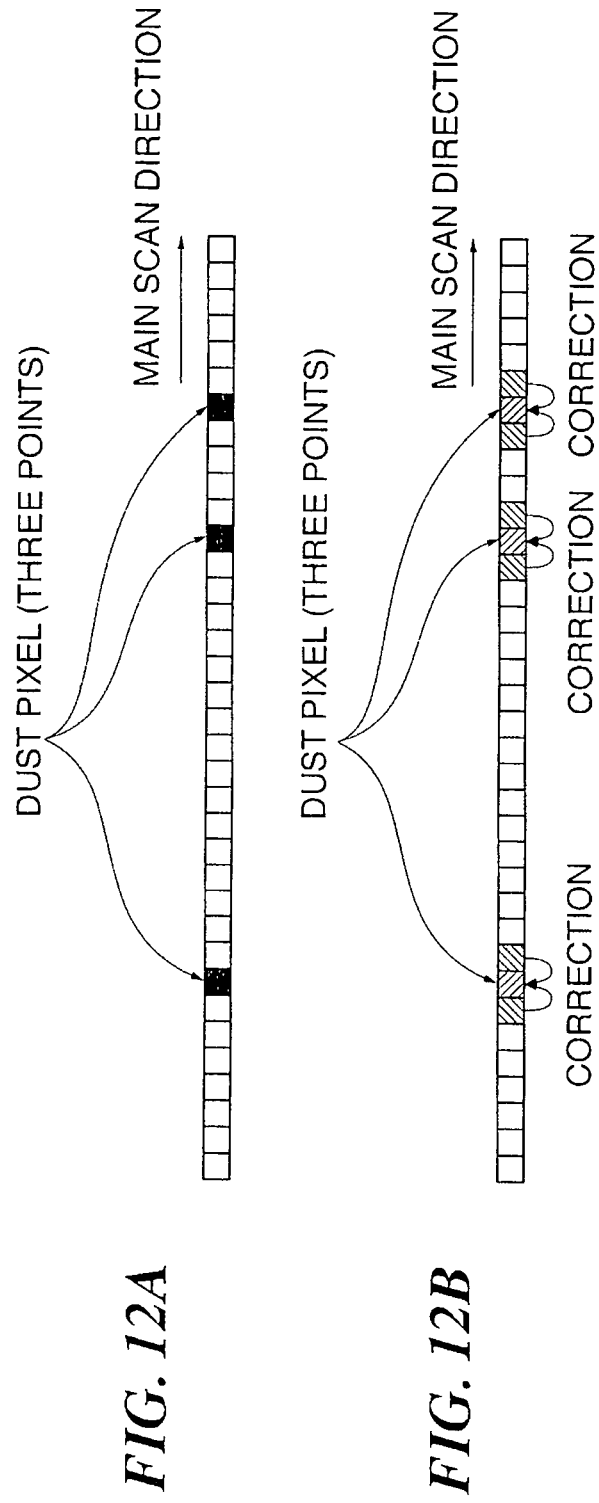
FIG. 12 is a chart useful in explaining dust correction processing.

As shown in FIG. 11, the dust detection processing section 805 detects, as a dust pixel, a pixel whose level is equal to or lower than a dust determination level. The dust number counting processing is to count the number of dust pixels detected by the dust detection processing section 805 and is executed by a dust number counting processing section 806. In the case of FIG. 11, there are three dust pixels. In the dust correction processing, image data read from the original corresponding to the pixels where the dusts are detected are interpolated with surrounding pixels as shown in FIG. 12, thereby making the dusts less conspicuous, and it is executed by a dust correction processing section 807. It should be noted that the dust correction processing may be correction processing to eliminate dusts from pixels where the dusts are detected.

In the dust detection processing and the dust correction processing executed by the dust detection processing section 805 and the dust correction processing section 807, respectively, the maximum processable number of image points (pixels) (maximum processable point number) is determined according to the time period corresponding to the sheet-to-sheet interval. The sheet-to-sheet interval correction processing section 504 executes the foregoing correction processing in a plurality of intervals of originals, creates the sheet-to-sheet interval correction data 808, and sets the sheet-to-sheet interval correction data 808 in the correction circuit 603 for use in image reading.

Next, a method for dust detection/dust correction history measurement will be described. In this embodiment, as the history measurement, the number of times of the dust detection/dust correction is counted.

The aforesaid dust correcting section 802 detects, in each sheet-to-sheet interval, whether or not (1) the dust detection processing and (2) the dust correction processing have normally finished, and saves in the nonvolatile memory 403 history information regarding the detection result for the past 16 times of the processing (16 sheet-to-sheet intervals).

In the dust number counting processing, information on the number of dust pixels detected from the image data of the feed belt 607 read via the platen glass 201 in each sheet-to-sheet interval is saved in the nonvolatile memory 403.

If the number of dust pixels is large when the dust correction processing is executed by the dust correction processing section 807, the correction time also becomes long and the dust correction processing sometimes cannot be finished within the time period corresponding to the sheet-to-sheet interval. Information on whether or not the dust correction processing fails to be finished within the time period corresponding to the sheet-to-sheet interval is saved in the nonvolatile memory 403.

Based on the history information saved in the nonvolatile memory 403, in a case where one of the following conditions is satisfied, the CPU 400 changes the reading mode of originals from the normal moving image reading mode (hereinafter, referred to as a first moving image reading mode) to a second moving image reading mode in which originals are fed at a longer sheet-to-sheet interval than that in the first moving original mode.

(Condition 1) The number of detected dust pixels is 8 or more and the number of dust pixels detected in the past 16 sheet-to-sheet intervals is on the increasing tendency.

(Condition 2) The dust correction processing fails to be normally finished consecutive three times.

Next, the change from the first moving original mode to the second moving original mode will be described.

Figure 13:
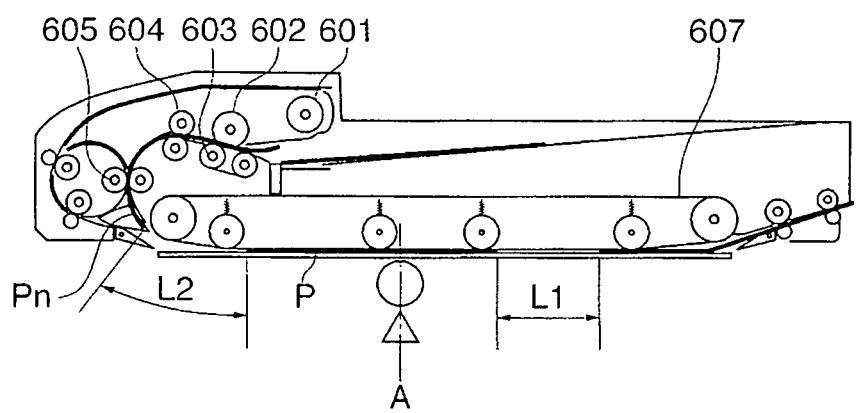
FIG. 13 is a view showing a relation between a sheet-to-sheet interval L1 in a first moving original mode and a sheet-to-sheet interval L2 in a second moving original mode.

The relation between a sheet-to-sheet interval L1 in the first moving original mode and a sheet-to-sheet interval L2 in the second moving original mode is L1<L2. In a case where one of the conditions 1, 2 is satisfied, the CPU 400 controls a rotational operation of the feed motor 681 so that the next sheet-to-sheet interval (interval between an original P and a subsequent original Pn) becomes equal to the sheet-to-sheet interval L2, as shown in FIG. 13. If one of the conditions 1, 2 is satisfied at the time when the final original is read or at the time when a job is finished (final part of a job), the sheet-to-sheet interval of the second moving original mode is set from the next job to read originals.

The sheet-to-sheet interval is calculated as follows.

Figure 14A:
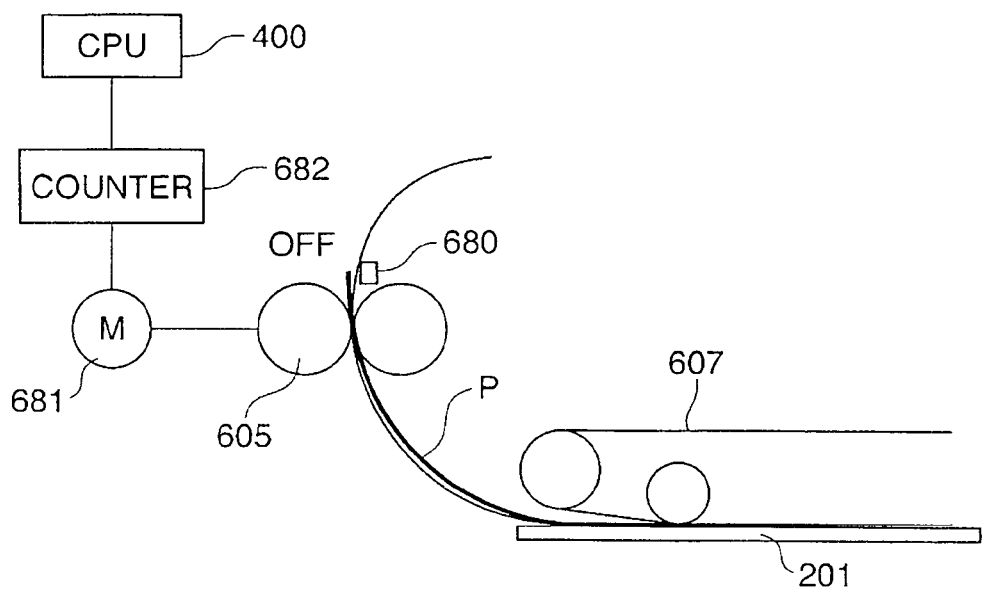
FIGS. 14A and 14B are views useful in explaining a method of calculating the sheet-to-sheet interval.

First, when a rear end of the original P passes through a position facing the resistor sensor 680 as in FIG. 14A, a counter 782 starts counting clocks of the feed motor 681 driving the resist roller 605 in response to the turning-off of the resistor sensor 680 serving as a trigger.

Figure 14B:
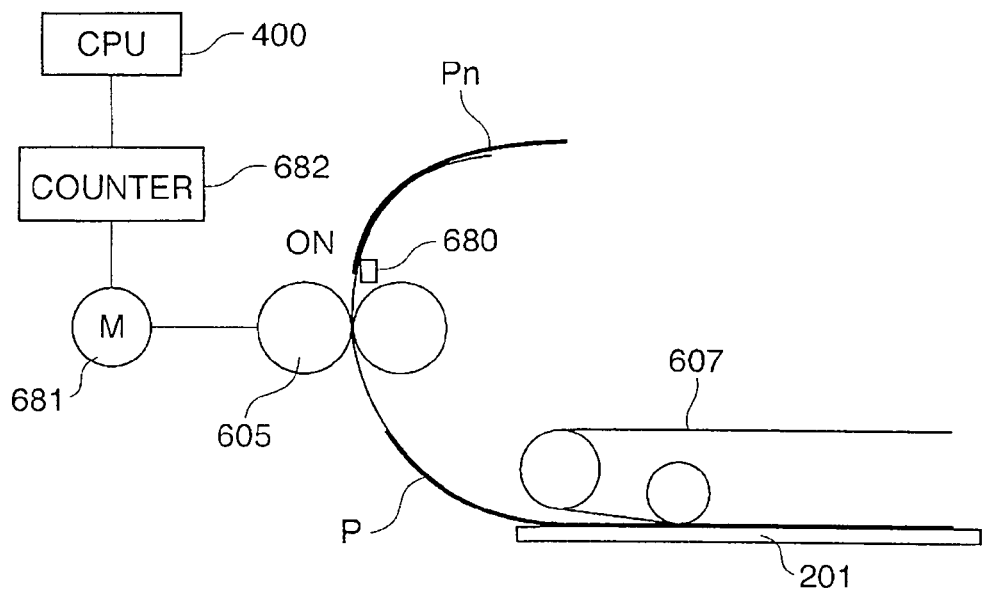

Then, the CPU 400 refers to the clocks of the feed motor 681 until a leading end of the subsequent original Pn reaches the resistor sensor 680 as in FIG. 14B to calculate how long the original P has advanced during a period between the passage of the original P and the arrival of the original Pn. That is, a movement interval z of the original P is calculated by z=Cn×q, where "Cn" is a count value of the counter 682 and "q" is an advancement amount of an original per clock of the feed motor 681. Therefore, the interval between the original P and the original Pn (sheet-to-sheet interval) is obtained as the movement distance z.

Then, in a case where L2>z is satisfied, the driving of the feed motor 681 is stopped for a time period corresponding to (L2−z)/v, where "v" is feeding speed of an original, and thereafter, the paper feed from the resist roller 605 is started. In a case where L2≦z is satisfied, the paper feed from the resist roller 605 is started without stopping the driving of the feed motor 681. In the above-described manner, the originals are fed while the sheet-to-sheet interval L2 is kept therebetween.

Thus securing the sheet-to-sheet interval L2 which is longer than the normal sheet-to-sheet interval L1 makes it possible to secure a longer time period (time period corresponding to L2/v) than the normal time period (time period corresponding to L1/v) for the dust detection processing and the dust correction processing.

Further, securing the longer time period (time period corresponding to L2/v) than the normal time period (time period corresponding to L1/v) for the dust detection processing and the dust correction processing makes it possible to increase the maximum number of points (pixels) processable in the dust detection processing and the dust correction processing. That is, more accurate dust detection processing and dust correction processing are made possible.

For example, the maximum number of points (pixels) processed by the dust detection processing section 805 and the dust correction processing section 807 in the first moving original mode is 15 points (pixels), but a maximum of 30 points (pixels) can be processed in the second moving original mode.

Further, in order to execute more accurate dust detection processing and dust correction processing than the dust detection processing and dust correction processing in the first moving original mode, the sheet-to-sheet interval according to the number of points (pixels) that should be subjected to the dust detection processing and dust correction processing may be set. For example, the CPU 400 sets a sheet-to-sheet interval x so that x≧t×n/v holds, where "x" is the sheet-to-sheet interval to be set, "t" is the time required for dust detection and dust correction per point, "n" is the number of detected points, and "v" is feeding speed.

Even when the reading mode of originals is changed to the second moving original mode according to the history information as described above, in a case where one of the following conditions is satisfied, a further change to the stationary original mode is also possible. It should be noted that in the stationary original mode, the scanner unit reads an original fixed on the platen glass while moving.

(Condition 3) The number of detected dust pixels is 5 or more and the number of dust pixels detected in the past 16 sheet-to-sheet intervals is on an increasing tendency.

(Condition 4) The dust correction processing fails to be normally finished consecutive three times.

That is, according to the history information regarding the dust detection processing and the dust correction processing, the second moving original mode can be changed to the stationary original mode. The stationary original mode has an advantage that streaks due to dust as occurring in the moving original do not easily occur in an original image, though the performance of the read operation lowers in the stationary original mode.

The directions of main scan and sub-scan of an original in the stationary original mode are reverse to those in the moving original mode, and therefore, image data obtained in the stationary original mode is a mirror image of an image read in the moving original mode. Therefore, further applying mirror image processing by the controller section 700 makes it possible to obtain normal image data.

Here, the first moving original mode may also be changed to the stationary original mode according to the history information regarding the dust detection processing and the dust correction processing. In this case, however, the following processing is necessary. Namely, in a case where an attempt to change the first moving original mode to the stationary original mode is made when an original is read in the first moving original mode with the normal sheet-to-sheet interval L1, a leading end of a subsequent original reaches the reading position, so that the image start signal is generated. Therefore, if the original is read in this state, the controller section 700 reads the original in the first moving original mode, so that mirror image data is obtained. Therefore, in a case where the first moving original mode is changed to the stationary original mode, processing to cancel the currently reading image is required for the controller section 700.

On the other hand, in a case where the reading mode is changed to the stationary original mode when an original is read in the second moving original mode in which originals are fed at the sheet-to-sheet interval L2, it is possible to notify the controller section 700 of the change to the stationary original mode prior to the generation of the image start signal of a subsequent original. Therefore, the subsequent original is not read, which enables smooth change to the stationary original operation.

In this manner, when the second moving original mode is changed to the stationary original mode, the sheet-to-sheet interval is widened in advance, so that the image start signal is not outputted prior to the change to the stationary original mode, which eliminates the need for the image canceling processing for the controller section 700.

Next, the operation for changing the second moving original mode to the stationary original reading mode will be described.

Figure 15A:
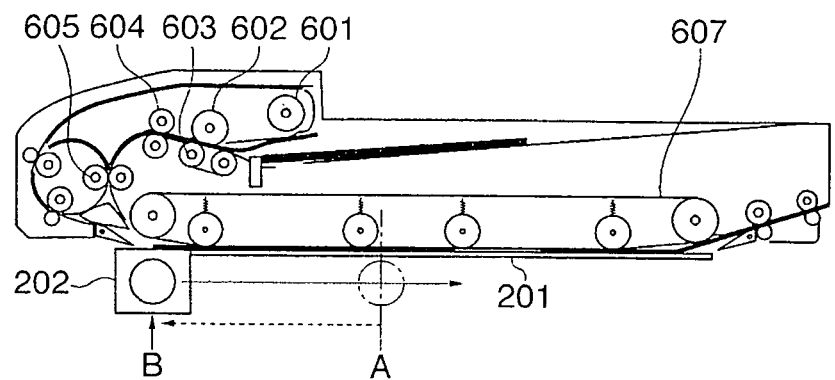
FIGS. 15A and 15B are views useful in explaining the operation when the second moving original mode is changed to the stationary original mode.

The change to the stationary original mode can be started from an original immediately after the condition 3 or the condition 4 is satisfied. That is, in a case where the condition 3 or the condition 4 is satisfied, a rear end of the original is placed on the position B that matches an end portion of the platen glass 201, as shown in FIG. 15A.

Figure 15B:
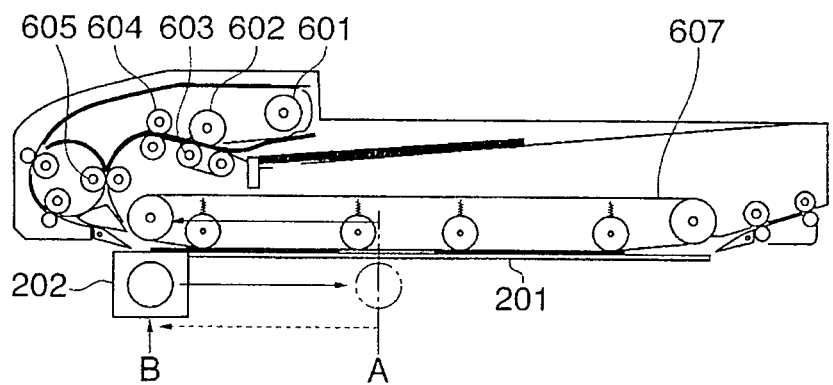

At this time, in a case where the original's length in the main scan direction is shorter than the interval between the moving original position A and the position B, since the rear end of the original has passed through the position B, the feed belt 607 is rotated in a reverse direction to move the rear end of the original back to the position B and then the stationary original operation follows (FIG. 15B).

In the above-described embodiment, the first moving original mode is changed to the second moving original mode, and further, the second moving original mode is changed to the stationary original mode, but the first moving original mode may be changed directly to the stationary original mode in a case where the sheet-to-sheet interval L1 in the first moving original mode is long enough to allow the direct change to the stationary original mode.

Figure 16:
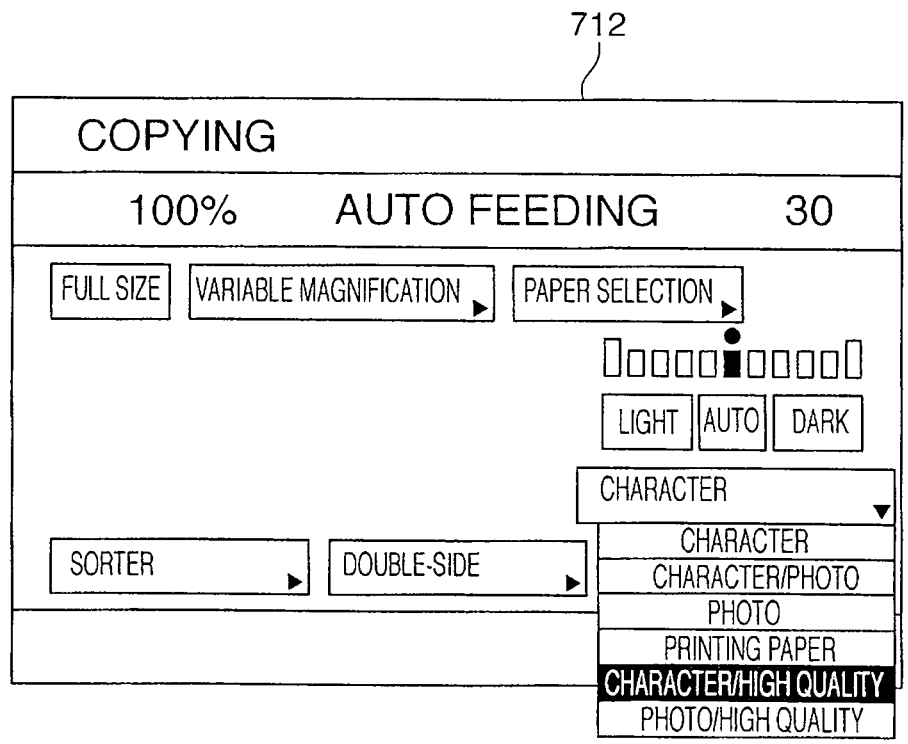
FIG. 16 is a view showing a display example of an operation section.

Further, in the above-describe embodiment, the first moving original mode is changed to the second moving original mode according to the history information, but the first moving original mode may be changed to the second moving original mode in a case where a high-image quality mode is set in the operation section 712 of the controller section 700 as in FIG. 16. In this case, the second moving original mode may be further changed to the stationary original mode in such a case where the number of detected dust pixels is also larger than a predetermined value in the second moving original mode similarly to the above-described case. Further, in a case where the high-image quality mode is set by the operation section 712, the first moving original mode may be directly changed to the stationary original mode, instead of being changed to the second moving original mode.

It should be noted that the second moving original mode may be changed to the first moving original mode in a case where the number of dust pixels detected in sheet-to-sheet intervals during the second moving original mode is decreasing.

Figure 17:
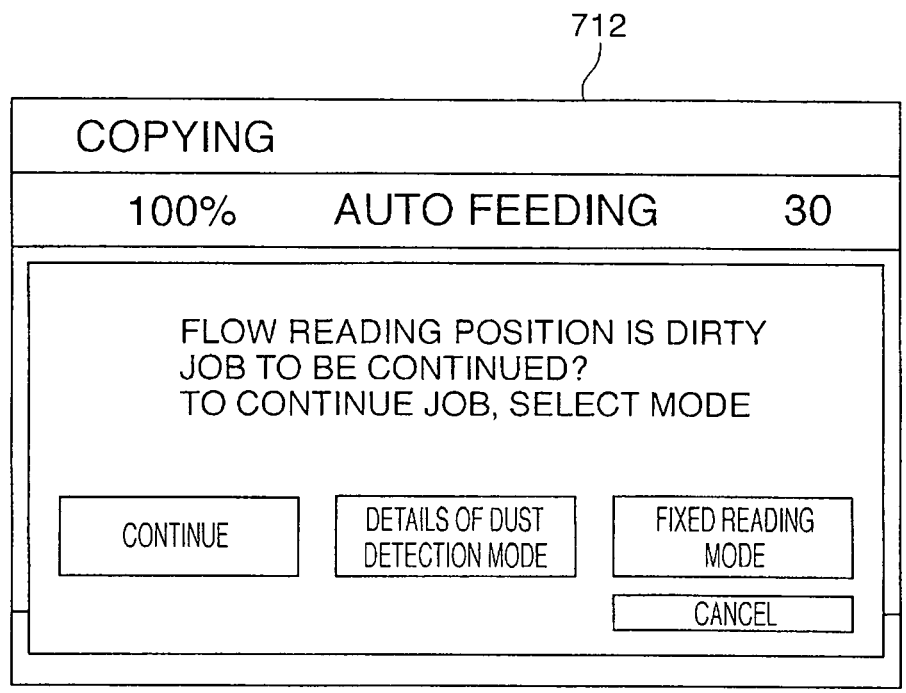
FIG. 17 is a view showing an example of an alarm window displayed on the operation section.

In this embodiment, as described above, the reading mode is automatically changed from the first moving original mode to the second moving original mode and from the second moving original mode to the stationary original mode based on the history information. However, such a structure is not restrictive, and another possible structure is to display an alarm window as in FIG. 17 on the operation section 712 when the condition for the change to each mode is satisfied. Then, by operating a touch panel of the alarm window 412, a user is capable of selecting the change from the first moving original mode to the second moving original mode, the change from the second moving original mode to the stationary original mode, or the change from the first moving original mode to the stationary original mode. The alarm window may be displayed on the operation section 712 immediately upon the detection of dust pixel in a sheet-to-sheet interval during the conveyance of originals (during a job) or may be displayed after the feeding of the whole original bundle 621 on the original tray 320 is finished (after the job).

In this embodiment, as described in detail above, according to the history information regarding foreign matter, the first moving original mode in which originals are kept spaced by the sheet-to-sheet interval L1 during the conveyance can be changed to the second moving original mode in which originals during the conveyance are kept spaced by the sheet-to-sheet interval L2 longer than the sheet-to-sheet interval L1, so that the sheet-to-sheet interval during the moving original can be made longer according to the past history regarding foreign matter (dust) during a moving original job. As a result, the time up to the feeding of a subsequent original is made longer, and this extended time allows accurate detection of foreign matter and accurate correction processing of the detected foreign matter, which makes it possible to read a good image free from the influence of foreign matter such as dust.

In the above-described embodiment, the first moving original mode is changed to the second moving original mode in a case where the condition 1 or the condition 2 is satisfied, but this is not restrictive. For example, in a case where the number of detected dust pixels per page exceeds a predetermined value (for example, 10), the first moving original mode may be automatically changed to the second moving original mode.

It is to be understood that the object of the present invention may also be accomplished by supplying a system or an apparatus with a storage medium in which a program code of software which realizes the functions of the above-described embodiment is stored, and causing a computer (or CPU or MPU) of the system or apparatus to read out and execute the program code stored in the storage medium.

In this case, the program code itself read from the storage medium realizes the functions of the above-described embodiment, and hence the program code and the storage medium on which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be supplied by downloading via a network.

Further, it is to be understood that the functions of the above-described embodiment may be accomplished not only by executing the program code read out by a computer, but also by causing an OS (operating system) or the like which operates on the computer to perform a part or all of the actual operations based on instructions of the program code.

Further, it is to be understood that the functions of the above-described embodiment may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

This application claims the benefit of Japanese Patent Application No. 2005-189796, filed Jun. 29, 2005, which is hereby incorporated by reference herein in its entirety.

What is claimed is:

1. An image reader comprising:
an original feeding section that sequentially feeds a plurality of originals sheet by sheet;
a reading section that reads images on the fed originals at a reading position to output image data;
a foreign matter detecting section that detects foreign matter existing at the reading position based on the image data output by said reading section during an original-to-original interval of the fed originals;
a correcting section that corrects the output image data for the originals based on a detection result of said foreign matter detecting section; and
a control section that controls said original feeding section and said reading section according to a history of the detection result of said foreign matter detecting section so as to selectively execute one of a first moving original reading mode with a first original-to-original interval of the fed originals and a second moving original reading mode with a second original-to-original interval of the fed originals longer than the first original-to-original interval,
wherein, in the first moving original reading mode, said control section controls said original feeding section to feed each of the originals while being read by said reading section and controls said original feeding section to feed the originals at the first original-to-original interval, and
wherein, in the second moving original reading mode, said control section controls said original feeding section to feed each of the originals while being read by said reading section and controls said original feeding section to feed the originals at the second original-to-original interval.

2. An image reader according to claim 1, further comprising a storage section that stores information regarding the foreign matter detected by said foreign matter detecting section,
wherein said control section controls said original feeding section and said reading section so as to selectively execute one of the first moving original reading mode and the second moving original reading mode according to the information stored in said storage section.

3. An image reader according to claim 2, wherein the information regarding the foreign matter includes the number of pieces of the foreign matter detected by said foreign matter detecting section
said control section controls said original feeding section and said reading section based on the number of pieces of the foreign matter.

4. An image reader according to claim 1, wherein in a case where the number of times said correcting section fails to normally finish the correction processing exceeds a predetermined value, said control section controls said original feeding section and said reading section so as to execute the second moving original reading mode.

5. An image reader according to claim 1, wherein said control section controls said original feeding section and said reading section according to the detection result of said foreign matter detecting section so as to selectively execute a stationary original reading mode, the stationary original reading mode being a mode in which the originals are fed by said original feeding section to be fixed at a predetermined position and said reading section reads the images on the originals while said reading section is moved.

6. An image reader according to claim 5, further comprising a setting section that sets a high-image quality mode in which said reading section reads the images on the originals with high image quality,
wherein in a case where said setting section sets the high-image quality mode, said control section controls said original feeding section and said reading section so as to execute the second moving original reading mode or the stationary original reading mode.

7. A control method for an image reader comprising an original feeding section that sequentially feeds a plurality of originals sheet by sheet and a reading section that reads images on the fed originals at a reading position to output image data, the method comprising:
a foreign matter detecting step of detecting foreign matter existing at the reading position based on the image data output by said reading section during an original-to-original interval of the fed originals;
a correcting step of correcting the output image data for the originals based on a detection result of said foreign matter detecting step; and
a control step of controlling said original feeding section and said reading section according to a history of the detection result of said foreign matter detecting step so as to selectively execute one of a first moving original reading mode with a first original-to-original interval of the fed originals and a second moving original reading mode with a second original-to-original interval of the fed originals longer than the first original-to-original interval, wherein, in the first moving original reading mode, said control step controls said original feeding section to feed each of the originals while being read by said reading section and controls said original feeding section to feed the originals at the first original-to-original interval, and wherein, in the second moving original reading mode, said control step controls said original feeding section to feed each of the originals while being read by said reading section and controls said original feeding section to feed the originals at the second original-to-original interval.

8. A non-transitory computer-readable storage medium storing a control program executed in an image reader comprising an original feeding section that sequentially feeds a plurality of originals sheet by sheet and a reading section that reads images on the fed originals at a reading position to output image data, the program comprising:

a foreign matter detecting module for detecting foreign matter existing at the reading position based on the image data output by said reading section during an original-to-original interval of the fed originals;

a correcting module that corrects the output image data for the originals based on a detection result of said foreign matter detecting module; and a control module for controlling said original feeding section and said reading section according to a history of the detection result of said foreign matter detecting module so as to selectively execute one of a first moving original reading mode with a first original-to-original interval of the fed originals and a second moving original reading mode with a second original-to-original interval of the fed originals longer than the first original-to-original interval, wherein, in the first moving original reading mode, said control module controls said original feeding section to feed each of the originals while being read by said reading section and controls said original feeding section to feed the originals at the first original-to-original interval, and wherein, in the second moving original reading mode, said control module controls said original feeding section to feed each of the originals while being read by said reading section and controls said original feeding section to feed the originals at the second original-to-original interval.

\* \* \* \* \*